US011463932B2

(12) United States Patent
Mok et al.

(10) Patent No.: US 11,463,932 B2
(45) Date of Patent: Oct. 4, 2022

(54) DEVICE AND METHOD FOR PERFORMING MEASUREMENT RELATED TO HANDOVER IN WIRELESS COMMUNICATION SYSTEM

(71) Applicant: Samsung Electronics Co., Ltd., Suwon-si (KR)

(72) Inventors: Young Joong Mok, Suwon-si (KR); Hyun Jeong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 16/763,841

(22) PCT Filed: Nov. 13, 2018

(86) PCT No.: PCT/KR2018/013846
§ 371 (c)(1),
(2) Date: May 13, 2020

(87) PCT Pub. No.: WO2019/098654
PCT Pub. Date: May 23, 2019

(65) Prior Publication Data
US 2020/0288370 A1    Sep. 10, 2020

(30) Foreign Application Priority Data
Nov. 14, 2017   (KR) .......................... 10-2017-0151677

(51) Int. Cl.
*H04B 7/185*       (2006.01)
*H04B 17/382*      (2015.01)
(Continued)

(52) U.S. Cl.
CPC ........ *H04W 36/32* (2013.01); *H04B 7/18502* (2013.01); *H04B 17/382* (2015.01);
(Continued)

(58) Field of Classification Search
CPC ..... H04B 7/185–18508; H04B 17/0082–3913; H04J 11/0069–0093;
(Continued)

(56) References Cited

U.S. PATENT DOCUMENTS

2010/0197298 A1\* 8/2010 So .......................... H04W 24/10
2017/0325221 A1  11/2017 Jalali
(Continued)

FOREIGN PATENT DOCUMENTS

| CN | 103597874 A  | 2/2014  |
|----|--------------|---------|
| KR | 10-1555020 B1 | 9/2015  |
| KR | 10-1784632 B1 | 10/2017 |

OTHER PUBLICATIONS

NTT Docomo, Inc.; Measurements Reporting Enhancements for UAV UE; 3GPP TSG-RAN2#99; R2-1709396 Aug. 21-25, 2017; Berlin, Germany.
(Continued)

*Primary Examiner* — Timothy J Weidner
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). A device and a method for performing a measurement related to handover are provided. A operation method of a terminal in a wireless communication system, according to various embodiments of the disclosure, comprises the steps of: receiving, from a base station, configuration information on at least one handover event corresponding to an elevation state of the terminal; and transmitting, to the base station, a measurement report message in response to the occurrence of the at least one handover event. Therefore, the device and the method, according to the various embodiments of the disclosure, can efficiently perform a measurement and/or a (Continued)

report for handover, and can prevent unnecessary handover and handover performance deterioration.

19 Claims, 13 Drawing Sheets

(51) Int. Cl.

| | | |
|---|---|---|
| *H04W 8/18* | (2009.01) | |
| *H04W 8/22* | (2009.01) | |
| *H04W 24/08* | (2009.01) | |
| *H04W 24/10* | (2009.01) | |
| *H04W 28/02* | (2009.01) | |
| *H04W 36/00* | (2009.01) | |
| *H04W 36/30* | (2009.01) | |
| *H04W 36/32* | (2009.01) | |
| *H04W 84/00* | (2009.01) | |
| *H04W 84/02* | (2009.01) | |
| *H04W 88/02* | (2009.01) | |
| *H04W 88/08* | (2009.01) | |
| *H04W 92/02* | (2009.01) | |
| *H04W 92/10* | (2009.01) | |

(52) U.S. Cl.
CPC ............... *H04W 8/18* (2013.01); *H04W 8/22* (2013.01); *H04W 24/08* (2013.01); *H04W 24/10* (2013.01); *H04W 28/0215* (2013.01); *H04W 28/0226* (2013.01); *H04W 36/0058* (2018.08); *H04W 36/0094* (2013.01); *H04W 36/00837* (2018.08); *H04W 36/30* (2013.01); *H04W 84/005* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ..... H04W 8/18–245; H04W 24/02–10; H04W 28/02–26; H04W 36/0005–385; H04W 40/005–38; H04W 48/02–20; H04W 60/005–06; H04W 84/005–22; H04W 88/005–12; H04W 92/02; H04W 92/04; H04W 92/10
See application file for complete search history.

(56) References Cited

U.S. PATENT DOCUMENTS

| | | | | |
|---|---|---|---|---|
| 2019/0180633 A1* | 6/2019 | Yoshizawa | ............ | H04W 24/10 |
| 2020/0033849 A1* | 1/2020 | Yiu | ....................... | H04W 24/10 |
| 2020/0236573 A1* | 7/2020 | Zhang | ................... | H04W 24/10 |

OTHER PUBLICATIONS

Huawei; Measurement Report Mechanism for Drones; 3GPP TSG-RAN WG2 Meeting #99; R2-1708545; Aug. 21-25, 2017; Berlin, Germany.
KDDI; Proposal of potential LTE enhancements for Aerial Vehicles; 3GPP TSG-RAN2 Meeting #98; May 15-19, 2017; Hangzhou, China.
Huawei; Analysis and Simulation of Handover Issues for Drones; 3GPP TSG-RAN WG2 Meeting #99; R2-1708544; Berlin, Germany, Aug. 21-25, 2017.
European Search Report dated Oct. 2, 2020; European Appln. No. 18879211.3-1212 / 3697129 PCT/KR2018013846.
3GPP; 3rd Generation Partnership Project; Technical Specification Group Radio Access Network; Evolved Universal Terrestrial Radio Access (E-UTRA); Radio Resource Control (RRC); Protocol specification (Release 15); 3GPP TS 36.331; V15.6.0; Jun. 2019; Valbonne, France.
3GPP; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15); 3GPP TS 36.300; V15.5.0; Mar. 2019; Valbonne, France.
3GPP; 3rd Generation Partnership Project; Technical Specification Group Services and System Aspects; General Packet Radio Service (GPRS) enhancements for Evolved Universal Terrestrial Radio Access Network (E-UTRAN) access (Release 15); 3GPP TS 23.401; V15.4.0; Jun. 2018; Valbonne, France.
Lenovo et al.; Discussion for potential measurement enhancements for aerial UE; 3GPP TSG-RAN WG2 Meeting#99bis; R2-1711374; Oct. 9-13, 2017; Prague, Czech.
Kyocera et al.; Considerations for cell selection and reselection with UAVs; 3GPP TSG-RAN WG2 #99bis R2-1710796; Oct. 9-13, 2017; Prague, Czech.
Nokia et al.; Potential mobility enhancements for UAVs; 3GPP TSG-RAN WG2 #99bis; R2-1711445; Resubmission of R2-1708667; Oct. 9-13, 2017; Prague, Czech.
Nokia et al.; Air-borne UE identification mechanism; 3GPP TSG-RAN WG2 #99bis; R2-1711446; Update of R2-1708669; Oct. 9-13, 2017; Prague, Czech.
KDDI, Proposal of potential LTE enhancements for Aerial Vehicles, 3GPP TSG-RAN2 Meeting #98 R2-1705999, Hangzhou, China, May 15-19, 2017.
Sony, Discussion on measurement for Aerial Vehicles handover, 3GPP TSG RAN WG2 Meeting #99b R2-1711027, Prague, Czech Republic, Oct. 9-13, 2017.
3rd Generation Partnership Project;Technical Specification Group Radio Access Network; Evolved Universal Terrestrial Radio Access (E-UTRA); Radio Resource Control (RRC); Protocol specification (Release 14); TS 36.331 V14.2.0 (Mar. 2017).
Huawei, HiSilicon, Potential enhancements for drones in idle state, 3GPP TSG-RAN WG2 Meeting #99bis R2-1710409, Prague, Czech Republic, Oct. 9-13, 2017.
Chinese Office Action dated Nov. 12, 2021, issued in Chinese Application No. 201880073852.X.
Korean Office Action dated Jan. 12, 2022, issued in Korean Application No. 10-2017-0151677.

* cited by examiner ically, to a device and a
method for performing measurement related to a handover
in a wireless communication system.

DEVICE AND METHOD FOR PERFORMING MEASUREMENT RELATED TO HANDOVER IN WIRELESS COMMUNICATION SYSTEM

TECHNICAL FIELD

The disclosure generally relates to a wireless communication system, and more particularly, to a device and a method for performing measurement related to a handover in a wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Terminals may be carried by users on the ground, but there may be aerial terminals flying in the air like drones. Such an aerial terminal should smoothly communicate with a base station, and, when the aerial terminal moves, the aerial terminal may need to perform a handover with a neighboring base station.

DISCLOSURE OF INVENTION

Technical Problem

Based on the above-described discussion, the disclosure provides a device and a method for performing measurement related to a handover in a wireless communication system.

In addition, the disclosure provides a device and a method for determining configuration information regarding a handover event based on an altitude state of a terminal in a wireless communication system.

In addition, the disclosure provides a device and a method for determining an altitude state of a terminal in a wireless communication system.

Solution to Problem

According to various embodiments, an operating method of a terminal in a wireless communication system may include a process of receiving, from a base station, configuration information regarding at least one handover event corresponding to an altitude state of the terminal, and a process of transmitting a measurement report message to the base station in response to occurrence of the at least one handover event.

According to various embodiments of the disclosure, an operating method of a base station in a wireless communication system may include a process of transmitting configuration information regarding at least one handover event corresponding to an altitude state of a terminal to the terminal, and a process of receiving a measurement report message from the terminal in response to occurrence of the at least one handover event.

According to various embodiments, a device of a terminal in a wireless communication system may include at least one transceiver which receives, from a base station, configuration information regarding at least one handover event corresponding to an altitude state of the terminal, and transmits a measurement report message to the base station in response to occurrence of the at least one handover event.

According to various embodiments of the disclosure, a device of a base station in a wireless communication system may include at least one transceiver which transmits configuration information regarding at least one handover event corresponding to an altitude state of a terminal to the terminal, and receives a measurement report message from the terminal in response to occurrence of the at least one handover event.

Advantageous Effects of Invention

The device and method according to various embodiments of the disclosure may differently set configuration information regarding a handover event based on an altitude state of a terminal, such that measurement and/or a report for the handover event can be efficiently performed, and unnecessary handover and/or handover performance deterioration can be prevented.

The effects that can be achieved by the disclosure are not limited to those mentioned in the above, and other effects that are not mentioned herein could be clearly understood by a person skilled in the art based on the following descriptions.

BEST MODE FOR CARRYING OUT THE INVENTION

Terms used in the disclosure are used to describe specified embodiments and are not intended to limit the scope of other embodiments. The terms of a singular form may include plural forms unless otherwise specified. All of the terms used herein, which include technical or scientific terms, may have the same meaning that is generally understood by a person skilled in the art. It will be further understood that terms, which are defined in a dictionary, may be interpreted as having the same or similar meanings as or to contextual meanings of the relevant related art and not in an idealized or overly formal way, unless expressly so defined herein in the disclosure. In some cases, even if the terms are terms which are defined in the specification, they should not be interpreted as excluding embodiments of the present disclosure.

In various embodiments of the disclosure described below, hardware-wise approach methods will be described by way of an example. However, various embodiments of the disclosure include technology using both hardware and software, and thus do not exclude software-based approach methods.

The disclosure relates to a device and a method for performing measurement related to a handover in a wireless communication system. Specifically, the disclosure describes technology for determining a handover event corresponding to an altitude state of a terminal in a wireless communication, and performing measurement related to the determined handover event. Herein, the altitude of the terminal may refer to a distance between a mean sea level and the terminal.

As used herein, terms indicating a signal, terms indicating information, terms indicating a message, terms indicating network entities, terms indicating an element of a device are merely examples for convenience of explanation. Accordingly, the disclosure is not limited to the terms described below, and other terms having the same technical meanings may be used.

In addition, the disclosure describes various embodiments by using terms used in some communication standards (for example, $3^{rd}$ generation partnership project (3GPP)), but this is merely for explanation. Various embodiments of the disclosure may be easily modified and applied to other communication systems.

Figure 1:
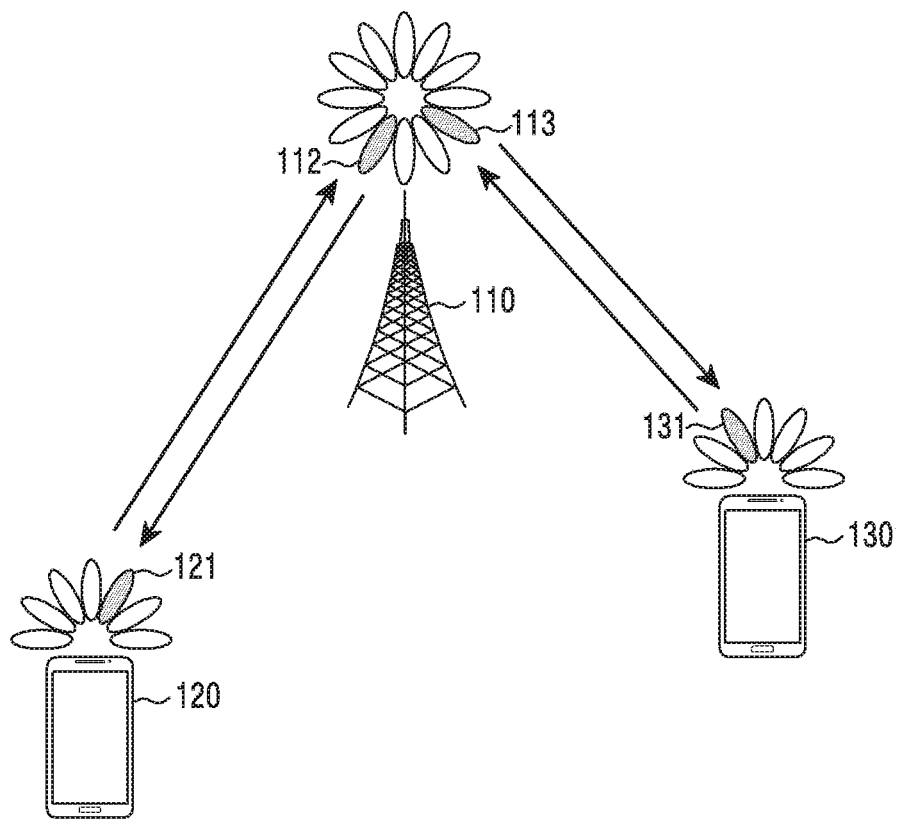
FIG. 1 is a view illustrating a wireless communication system according to various embodiments of the disclosure.

FIG. 1 illustrates a wireless communication system according to various embodiments of the disclosure. FIG. 1 illustrates a base station 110, a terminal 120, and a terminal 130 as a part of nodes using a wireless channel in a wireless communication system. FIG. 1 illustrates only one base station, but other base stations which are the same as or similar to the base station 110 may further be included.

The base station 110 is a network infrastructure that provides wireless access to the terminals 120, 130. The base station 110 has a coverage that is defined as a predetermined geographical area based on a distance by which a signal can be transmitted. The base station 110 may be referred to as "access point (AP)," "eNodeB (eNB)," "$_5$th generation (5G) node," "wireless point," "transmission/reception point (TRP)," or other terms having the same technical meaning as the above-mentioned terms, in addition to the base station.

Each of the terminal 120 and the terminal 130 is a device which is used by a user, and may communicate with the base station 110 through a wireless channel. In some cases, at least one of the terminal 120 and the terminal 130 may be operated without user's intervention. That is, at least one of the terminal 120 and the terminal 130 is a device which performs machine type communication (MTC), and may not be carried by a user. Each of the terminal 120 and the terminal 130 may be referred to as "user equipment (UE)," "mobile station," "subscriber station," "remote terminal," "wireless terminal," or "user device," or other terms having the same technical meaning as the above-mentioned terms, in addition to the terminal.

The base station 110, the terminal 120, the terminal 130 may transmit and receive wireless signals in millimeter wave (mmWave) bands (for example, 28 GHz, 30 GHz, 38 GHz, 60 GHz). In this case, the base station 110, the terminal 120, the terminal 130 may perform beamforming to enhance a channel gain. Herein, beamforming may include transmission beamforming and reception beamforming. That is, the base station 110, the terminal 120, the terminal 130 may give directivity to a transmission signal or a reception signal. To achieve this, the base station 110 and the terminals 120, 130 may select serving beams 112, 113, 121, 131 through a beam search or beam management procedure. After the serving beams 112, 113, 121, 131 are selected, communication may be performed through resources that have a quasi co-located (QCL) relationship with resources which transmit the serving beams 112, 113, 121, 131.

Figure 2:
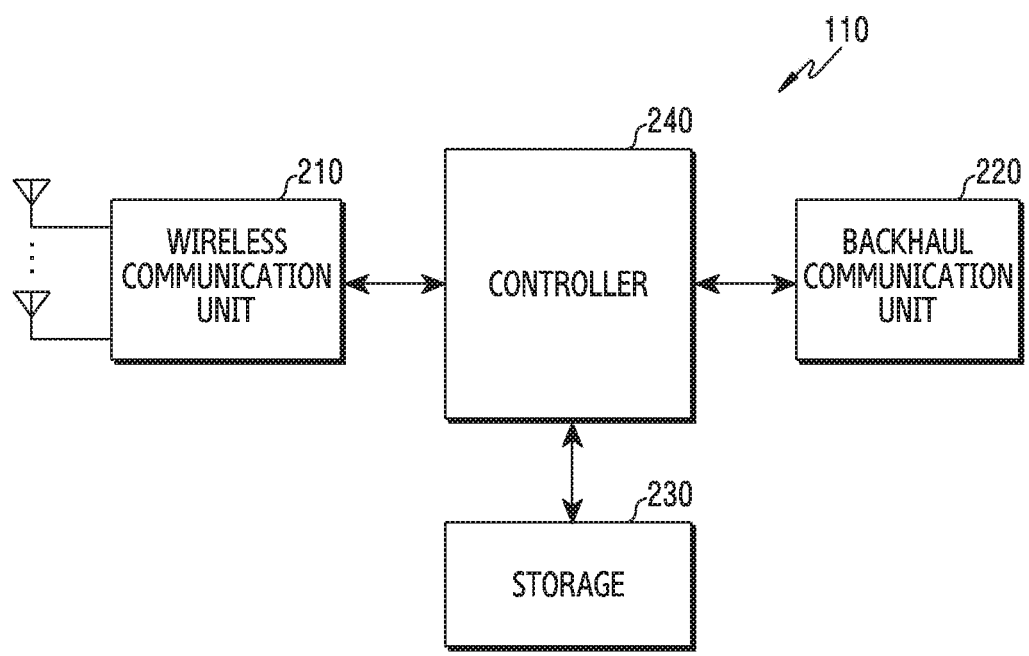
FIG. 2 is a view illustrating a configuration of a base station in a wireless communication system according to various embodiments of the disclosure.

FIG. 2 illustrates a configuration of a base station in a wireless communication system according to various embodiments of the disclosure. The configuration illustrated in FIG. 2 may be understood as a configuration of the base station 110. The term "unit" or terms ending with suffixes "-er," and "-or" refer to a unit processing at least one function or operation, and may be implemented by hardware, software, or a combination of hardware and software.

Referring to FIG. 2, the base station 110 may include a wireless communication unit 210, a backhaul communication unit 220, a storage 230, and a controller 240.

The wireless communication unit 210 performs functions for transmitting and receiving signals via a wireless channel. For example, the wireless communication unit 210 may perform a function of converting between a baseband signal and a bit stream according to a physical layer standard of the system. For example, when transmitting data, the wireless communication unit 210 may generate complex symbols by encoding and modulating a transmission bit stream. In addition, when receiving data, the wireless communication unit 210 may restore a reception bit stream by demodulating and decoding a baseband signal. In addition, the wireless communication unit 210 may up-convert a baseband signal into a radio frequency (RF) band signal, and then may transmit the signal via an antenna, and may down-convert an RF band signal received via an antenna into a baseband signal.

To achieve this, the wireless communication unit 210 may include a transmission filter, a reception filter, an amplifier, a mixer, an oscillator, a digital to analog converter (DAC), an analog to digital converter (ADC), or the like. In addition, the wireless communication unit 210 may include a plurality of transmission and reception paths. Furthermore, the wireless communication unit 210 may include at least one antenna array including a plurality of antenna elements. In the hardware aspect, the wireless communication unit 210 may be configured by a digital unit and an analog unit, and the analog unit may be configured by a plurality of sub-units according to operating power, an operating frequency, or the like.

The wireless communication unit 210 may transmit and receive signals as described above. Accordingly, an entirety or a portion of the wireless communication unit 210 may be referred to as a "transmitter," "receiver," or "transceiver." In addition, in the following description, transmitting and receiving via a wireless channel may be used as a meaning including processing by the wireless communication unit 210 as described above.

The backhaul communication unit 220 provides an interface for communicating with the other nodes in the network. That is, the backhaul communication unit 220 may convert a bit stream to be transmitted from the base station to another node, for example, another access node, another base station, an upper node, a core network, or the like, into a physical signal, and may convert a physical signal transmitted from another node into a bit stream The storage 230 may store data such as a basic program for the operation of the base station 110, an application program, configuration information, or the like. The storage 230 may be configured by a volatile memory, a nonvolatile memory, or a combination of a volatile memory and a nonvolatile memory. In addition, the storage 230 provides stored data according to a request of the controller 240.

The controller 240 controls overall operations of the base station 110. For example, the controller 240 may transmit and receive signals via the wireless communication unit 210 or the backhaul communication unit 220. In addition, the controller 240 may write and read out data on or from the storage 230. In addition, the controller 240 may perform functions of a protocol stack required by the communication standard. To achieve this, the controller 240 may include at least one processor.

According to various embodiments, the controller 240 may control to transmit, to a terminal, configuration information regarding at least one handover event corresponding to an altitude state of the terminal, and to receive a measurement report message from the terminal in response to occurrence of the at least one handover event. For example, the controller 240 may control the base station 110 to perform operations according to various embodiments, which will be described below.

Figure 3:
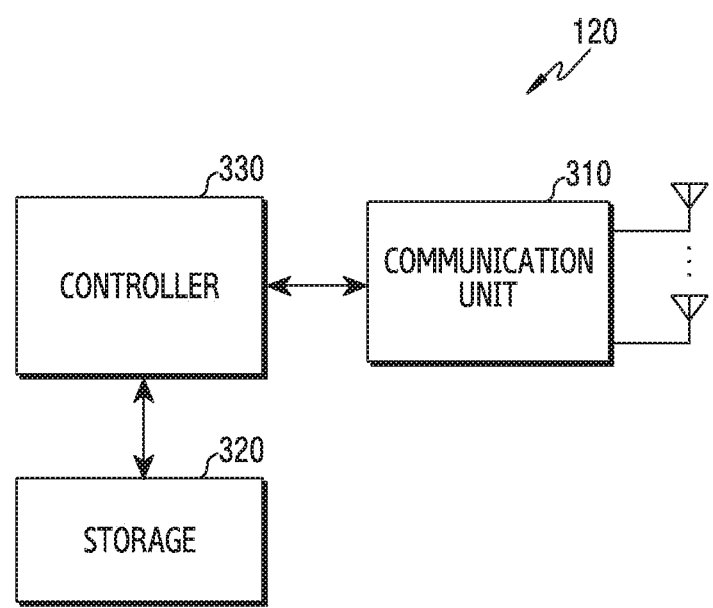
FIG. 3 is a view illustrating a configuration of a terminal in a wireless communication system according to various embodiments of the disclosure.

FIG. 3 illustrates a configuration of a terminal in a wireless communication system according to various embodiments of the disclosure. The configuration illustrated in FIG. 3 may be understood as a configuration of the terminal 120. The term "unit" or terms ending with suffixes "-er," and "-or" used in the following description refer to a unit processing at least one function or operation, and may be implemented by hardware, software, or a combination of hardware and software.

Referring to FIG. 3, the terminal 120 may include a communication unit 310, a storage 320, and a controller 330.

The communication unit 310 performs functions for transmitting and receiving signals via a wireless channel. For example, the communication unit 310 may perform a function of converting between a baseband signal and a bit stream according to a physical layer standard of the system. For example, when transmitting data, the communication unit 310 may generate complex symbols by encoding and modulating a transmission bit stream. In addition, when receiving data, the communication unit 310 may restore a reception bit stream by demodulating and decoding a baseband signal. In addition, the communication unit 310 may up-convert a baseband signal into an RF band signal, and then may transmit the signal via an antenna, and may down-convert an RF band signal received via an antenna into a baseband signal. For example, the communication unit 310 may include a transmission filter, a reception filter, an amplifier, a mixer, an oscillator, a DAC, an ADC, or the like.

In addition, the communication unit 310 may include a plurality of transmission and reception paths. Furthermore, the communication unit 310 may include at least one antenna array including a plurality of antenna elements. In the hardware aspect, the communication unit 310 may be configured by a digital circuit and an analog circuit (for example, a radio frequency integrated circuit (RFIC)). Herein, the digital circuit and the analogue circuit may be implemented as a single package. In addition, the communication unit 310 may include a plurality of RF chains. Furthermore, the communication unit 310 may perform beamforming.

The communication unit 310 may transmit and receive signals as described above. Accordingly, an entirety or a portion of the communication unit 310 may be referred to as a "transmitter," "receiver," or "transceiver." In addition, in the following description, transmitting and receiving via a wireless channel may be used as a meaning including processing by the communication unit 310 as described above.

The storage 320 may store data such as a basic program for the operation of the terminal 120, an application program, configuration information, or the like. The storage 320 may be configured by a volatile memory, a nonvolatile memory, or a combination of a volatile memory and a nonvolatile memory. In addition, the storage 320 provides stored data according to a request of the controller 330.

The controller 330 controls overall operations of the terminal 120. For example, the controller 330 may transmit and receive signals via the communication unit 310. In addition, the controller 330 may write and read out data on or from the storage 320. In addition, the controller 330 may perform functions of a protocol stack required by the communication standard. To achieve this, the controller 330 may include at least one processor or micro processor, or may be a portion of a processor. In addition, a portion of the communication unit 310 and the controller 330 may be referred to as a communication processor (CP).

According to various embodiments, the controller 330 may control to receive, from a base station, configuration information regarding at least one handover event corresponding to an altitude state of the terminal, and to transmit a measurement report message to the base station in response to occurrence of the at least one handover event. The controller 330 may control the terminal to perform operations according to various embodiments, which will be described below.

Figure 4:
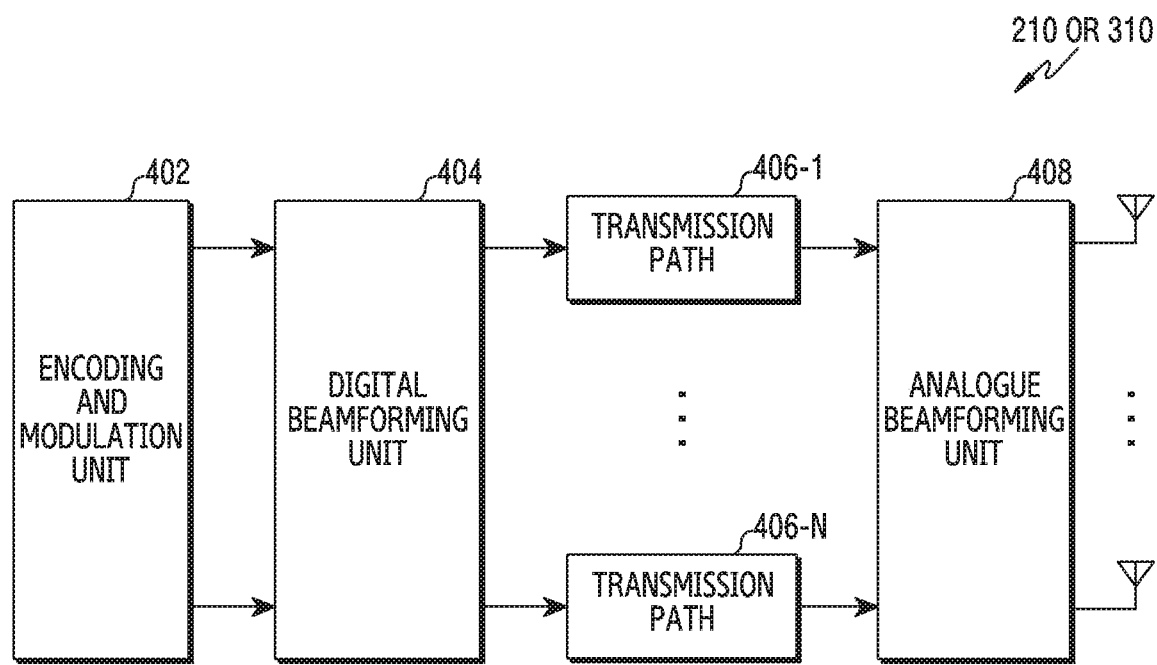
FIG. 4 is a view illustrating a configuration of a communication unit in a wireless communication system according to various embodiments of the disclosure.

FIG. 4 illustrates a configuration of a communication unit in a wireless communication system according to various embodiments of the disclosure. FIG. 4 illustrates an example of a detailed configuration of the wireless communication unit 210 of FIG. 2 or the wireless communication 210 of FIG. 3. Specifically, FIG. 4 illustrates components for performing beamforming as a portion of the wireless communication unit 210 of FIG. 2 or the communication unit 310 of FIG. 3.

Referring to FIG. 4, the wireless communication unit 210 or the communication unit 310 may include an encoding and modulation unit 402, a digital beamforming unit 404, a plurality of transmission paths 406-1 to 406-N, an analog beamforming unit 408.

The encoding and modulation unit 402 performs channel encoding. To perform channel encoding, at least one of a low density parity check (LDPC) code, a convolution code, a polar code may be used. The encoding and modulation unit 402 may generate modulation symbols by performing constellation mapping.

The digital beamforming unit 404 performs beamforming with respect to a digital signal (for example, modulation symbols). To achieve this, the digital beamforming unit 404 multiplies modulation symbols by beamforming weights. Herein, the beamforming weights may be used to change a size and a phase of a signal, and may be referred to as "precoding matrix," "precoder." The digital beamforming unit 404 outputs digitally beamformed modulation symbols to the plurality of transmission paths 406-1 to 406-N. In this case, according to the multiple input multiple output (MIMO) transmission technique, the modulation symbols may be multiplexed, or the same modulation symbols may be provided to the plurality of transmission paths 406-1 to 406-N.

The plurality of transmission paths 406-1 to 406-N convert the digitally beamformed digital signals into analogue signals. To achieve this, each of the plurality of transmission paths 406-1 to 406-N may include an inverse fast Fourier transform (IFFT) calculation unit, a cyclic prefix (CP) insertion unit, a DAC, an up-conversion unit. The CP insertion unit is to perform orthogonal frequency division multiplexing (OFDM), and may be excluded when other physical layer methods (for example, a filter bank multi-carrier (FBMC)) are applied. That is, the plurality of transmission paths 406-1 to 406-N provide independent signal processing processes with respect to a plurality of streams generated through digital beamforming. However, some of the components of the plurality of transmission paths 406-1 to 406-N may be used in common according to an implementation method.

The analogue beamforming unit 408 performs beamforming with respect to the analogue signal. To achieve this, the digital beamforming unit 404 multiplies the analogue signals by beamforming weights. Herein, the beamforming weights may be used to change a size and a phase of a signal.

Figure 5:
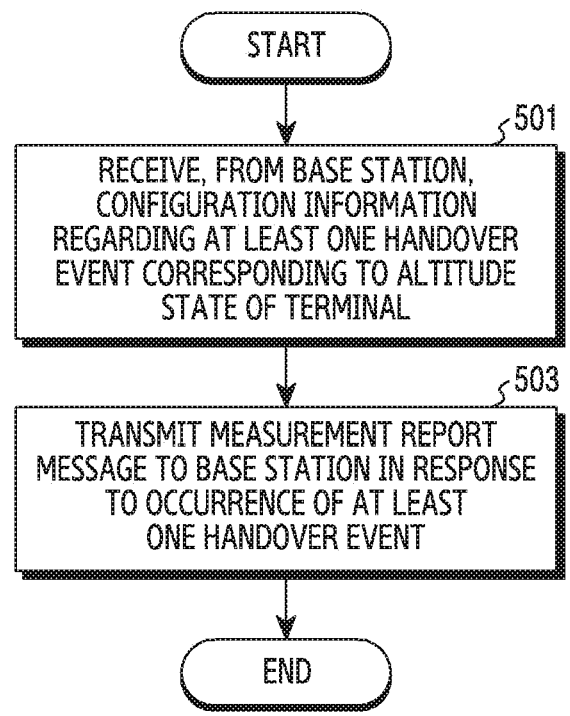
FIG. 5 is a flowchart of a terminal in a wireless communication system according to various embodiments of the disclosure.

FIG. 5 illustrates a flowchart of a terminal in a wireless communication system according to various embodiments of the disclosure. FIG. 5 illustrates an operating method of the terminal 120.

Referring to FIG. 5, at step 501, the terminal receives, from a base station, configuration information regarding at least one handover event corresponding to an altitude state of the terminal. The altitude state of the terminal may include at least one of an aerial state and a ground state. According to various embodiments of the disclosure, the aerial state refers to a state in which the altitude of the terminal is higher than a threshold altitude, and the ground state refers to a state in which the altitude of the terminal is lower than the threshold altitude. In addition, the terminal in the aerial state may be referred to as an "aerial terminal," and the terminal in the ground state may be referred to as a "ground terminal." The aerial terminal may include an unmanned aerial vehicle (UAV). According to various embodiments of the disclosure, the altitude state of the terminal may be pre-set. For example, an identifier (ID) indicating the aerial terminal may be included in a universal subscriber identity module (USIM) of the terminal, and, in this case, the altitude state of the terminal may be pre-set to the aerial state. For example, the ID indicating the aerial terminal may include a UAV ID. According to various embodiments of the disclosure, "configuration information regarding the handover event" may be shortly referred to as a "handover event," and these terms may be interchangeably used in the disclosure.

At step 503, the terminal transmits a measurement report message to the base station in response to occurrence of the at least one handover event. The at least one handover event may include at least one of a first handover event corresponding to the aerial state, and a second handover event corresponding to the ground state. In this case, the configuration information received by the terminal at step 501 may include at least one of information regarding a first time-to-trigger (TTT) and a first measurement condition (for example, a signal threshold value, a calibration signal value) related to the first handover event, and information regarding a second TTT and a second measurement condition (for example, a signal threshold value, a calibration signal value) related to the second handover event. The first measurement condition may correspond to a case where a signal strength of a neighboring base station is greater than a threshold value, and the second measurement condition may correspond to a case where the signal strength of the neighboring base station is greater than a signal strength of the base station from which the terminal receives a service (that is, a serving station of the terminal) by the threshold value. For example, when a state in which the first measurement condition is satisfied is maintained for longer than the first TTT, the terminal may determine that the first handover event occurs, and may transmit, to the base station, a measurement report message including information regarding measurement performed to make such determination. According to various embodiments of the disclosure, the measurement report message may include measurement information regarding the signal strength of the neighboring base station and/or an average signal strength of the neighboring base station. In another example, when a state in which the second measurement condition is satisfied is maintained for longer than the second TTT, the terminal may determine that the second handover event occurs, and may transmit, to the base station, a measurement report message including information regarding measurement performed to make such determination. For example, the measurement report message may include measurement information regarding the signal strength of the neighboring base station and/or the average signal strength of the neighboring base station. In the above-described embodiments, the first TTT may be shorter than the second TTT.

Figure 6:
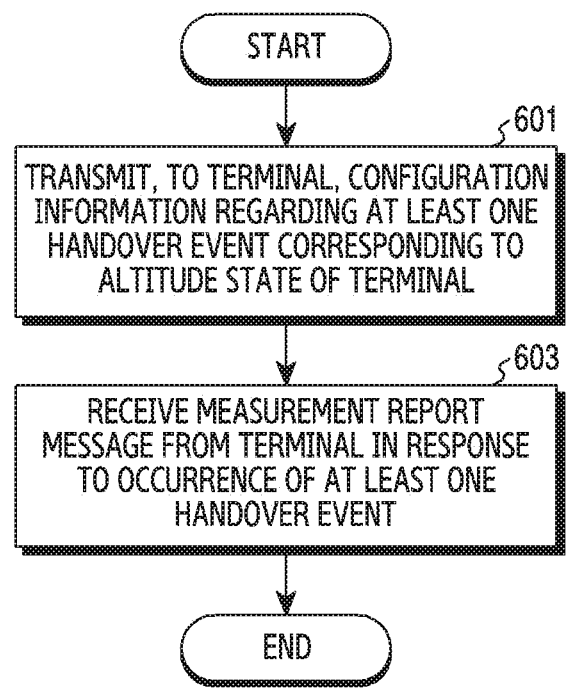
FIG. 6 is a flowchart of a base station in a wireless communication system according to various embodiments of the disclosure.

FIG. 6 illustrates a flowchart of a base station in a wireless communication system according to various embodiments of the disclosure. FIG. 6 illustrates an operating method of the base station 110.

Referring to FIG. 6, at step 610, the base station transmits, to a terminal, configuration information regarding at least one handover event corresponding to an altitude state of the terminal.

At step 630, the base station receives a measurement report message from the terminal in response to occurrence of the at least one handover event.

According to various embodiments of the disclosure, the terminal may determine a handover event corresponding to an altitude state of the terminal from among a plurality of handover events, or the base station may receive information regarding the altitude state of the terminal from the terminal and may determine a handover event corresponding to the altitude state of the terminal. Hereinafter, embodiments in which the terminal determines a handover event corresponding to an altitude state of the terminal from among a plurality of handover events will be described through FIGS. 7 to 10.

Figure 7:
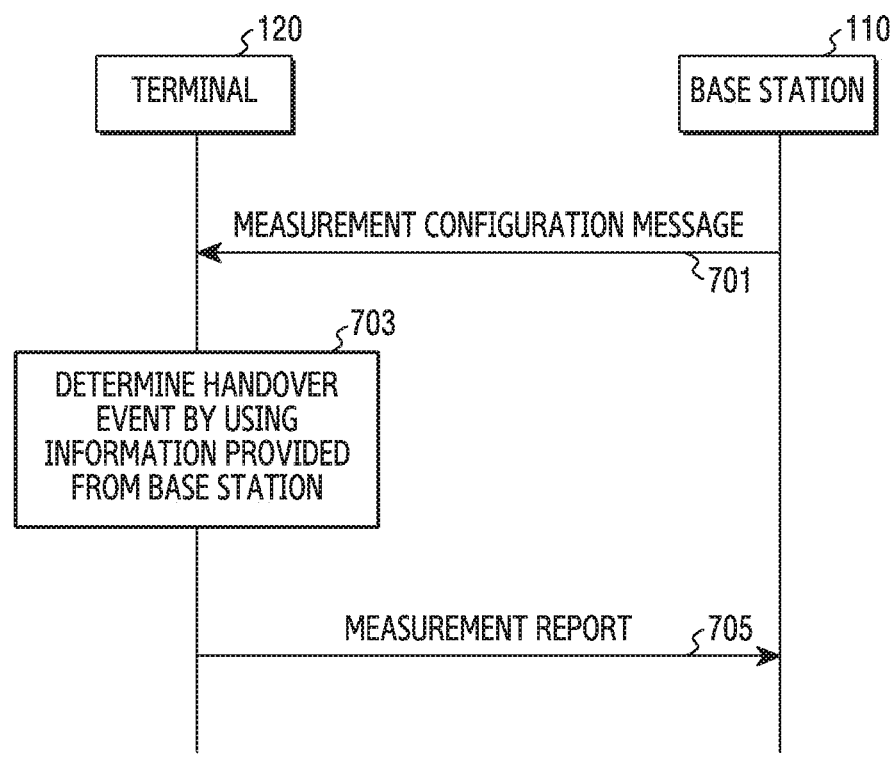
FIG. 7 is a view illustrating a signal flow for determining a handover event by a terminal in a wireless communication system according to various embodiments of the disclosure.

FIG. 7 illustrates a signal flow for determining a handover event by a terminal in a wireless communication system according to various embodiments of the disclosure. FIG. 7 illustrates a signal flow between the base station 110 and the terminal 120.

Referring to FIG. 7, at step 701, the base station transmits a measurement configuration message to the terminal. The measurement configuration message may include configuration information regarding a plurality of handover events. For example, the measurement configuration message may include configuration information regarding the first handover event corresponding to the aerial state, and configuration information regarding the second handover event corresponding to the ground state. According to various embodiments of the disclosure, the measurement report message (measurement configuration message) and/or respective configuration information may include information regarding a threshold altitude (height_threshold). The threshold altitude may be a reference altitude for determining an altitude state of the terminal, and for example, may indicate a height of the base station (that is, a serving station of the terminal) from which the terminal receives a service.

The configuration information regarding the plurality of handover events and the threshold altitude may be expressed in a radio resource control (RRC) message. For example, triggerType of ReportConfiguEUTRA in the RRC message may be set to one of a plurality of different trigger events according to the altitude state of the terminal, and a field regarding the threshold altitude may be included in the RRC message. According to various embodiments of the disclosure, the trigger event may be referred to as configuration information regarding the handover events and/or a measurement trigger event. For example, when the altitude of the terminal is higher than the threshold altitude (that is, the terminal is in the aerial state), the trigger event may include an event A4, and, when the altitude of the terminal is lower than the threshold altitude (that is, the terminal is in the ground state), the trigger event may include an event A3. Herein, the event A3 and the event A4 may correspond to measurement conditions, and the event A4 may correspond to a case where a signal strength of a neighboring base station is greater than a threshold value, and the event A3 may correspond to a case where the signal strength of the neighboring base station is greater than a signal strength of the serving base station by the threshold value.

According to various embodiments of the disclosure, the information regarding the threshold altitude may not be included in the measurement configuration message, and may be included in system information or a dedicated message. In other words, the information regarding the threshold altitude may be transmitted to the terminal through the system information or the dedicated message. In this case, the measurement configuration message may include a plurality of trigger events according to the altitude state. The plurality of trigger events may include different TTTs and measurement conditions (for example, the event A3, the event A4).

At step 703, the terminal determines a handover event by using the information provided from the base station. For example, the terminal may determine a handover event by using the information regarding the threshold altitude. The terminal may periodically measure the altitude of the terminal and may compare the measured altitude of the terminal and the threshold altitude, and may determine an altitude state of the terminal based on the result of comparing. For example, when the altitude of the terminal is higher than the threshold altitude, the altitude state of the terminal may be determined as the aerial state, and the terminal may determine the first handover event corresponding to the aerial state. In another example, when the altitude of the terminal is lower than the threshold altitude, the altitude state of the terminal may be determined as the ground state, and the terminal may determine the second handover event corresponding to the ground state. In the disclosure, the first handover event may be referred to as a measurement trigger event A, and the second handover event may be referred to as a measurement trigger event B.

According to various embodiments of the disclosure, the measurement configuration message and/or configuration information regarding each handover event may include parameters for determining the altitude state of the terminal, in addition to the information regarding the threshold altitude. For example, the measurement configuration message and/or the configuration information regarding each handover event may include at least one of the threshold altitude, a threshold signal strength (C_neigh_RSRP_th), a threshold number (N_NeighCell_Threshold), a threshold duration time (T_Period), a threshold average signal strength (Avg_NeighCell_RSRP_th). The threshold signal strength refers to a threshold value regarding a signal strength of a neighboring base station for the terminal to determine the neighboring base station as a discoverable neighboring base station. The threshold number refers to a threshold value regarding the number of neighboring base stations discovered by the terminal. The threshold duration time refers to a threshold value regarding a time during which more than the threshold number neighboring base stations are maintained as being discovered, or refers to a time at which a threshold timer starting from the time more than the threshold number neighboring base stations are discovered expires. The threshold average signal strength refers to a threshold value regarding an average of signal strengths of the neighboring base stations. The terminal may determine the altitude state of the terminal by using at least one of the above-described parameters, and may determine a handover event corresponding to the determined altitude state of the terminal. The above-described parameters may also be included in the system information or the dedicated message.

At step 705, the terminal transmits a measurement report message to the base station. When it is determined that the handover event determined at step 703 occurs, the terminal may transmit the measurement report message including information regarding measurement performed to make such determination to the base station.

According to various embodiments of the disclosure, the measurement report message may include information regarding whether measurement regarding the neighboring base station satisfies the handover event, and/or a time during which the handover event is satisfied. In another example, the measurement report message may include the altitude state of the terminal, and may include a flying path of the terminal. The base station may determine whether the handover of the terminal is performed, by using information included in the measurement report message, although this is not illustrated.

Figure 8:
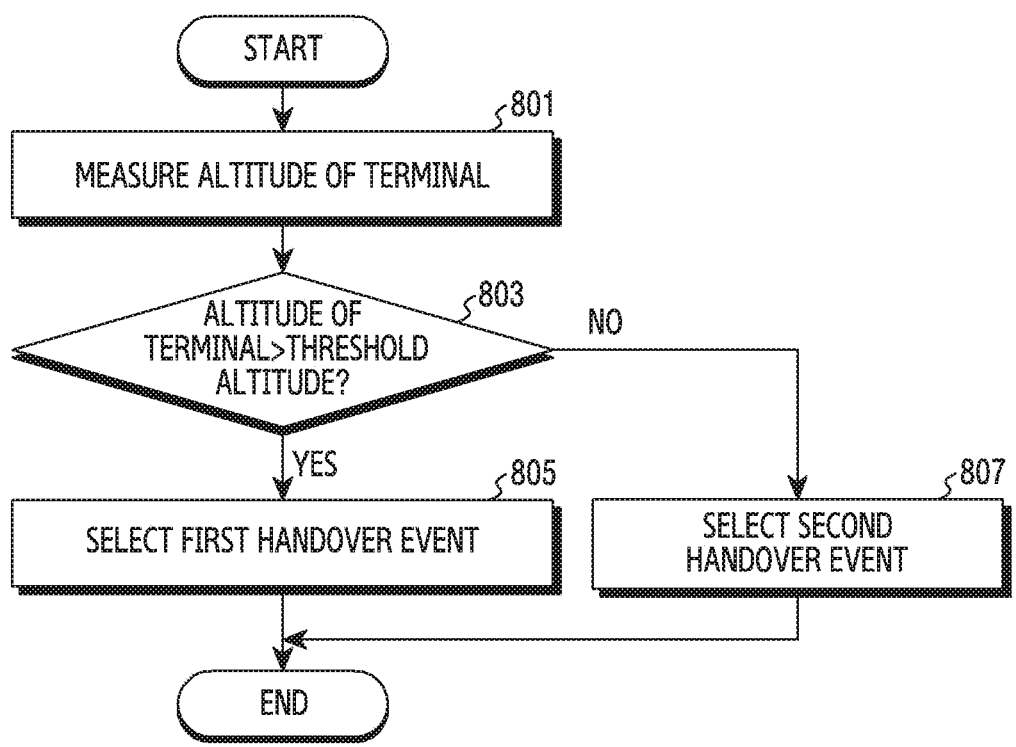
FIG. 8 is a flowchart of a terminal for measuring an altitude of a terminal and determining a handover event in a wireless communication system according to various embodiments of the disclosure.

FIG. 8 illustrates a flowchart of a terminal for measuring an altitude of the terminal and determining a handover event in a wireless communication system according to various embodiments of the disclosure. FIG. 8 illustrates an operating method of the terminal 120.

Referring to FIG. 8, at step 801, the terminal measures an altitude of the terminal. For example, the terminal may measure the altitude of the terminal by using a global positioning system (GPS) sensor. The terminal may periodically or aperiodically measure the altitude of the terminal.

At step 803, the terminal determines whether the altitude of the terminal is higher than a threshold altitude. For example, the terminal may receive information regarding the threshold altitude from a base station through system information or an RRC message, and may compare the altitude of the terminal and the threshold altitude.

When the altitude of the terminal measured by the terminal is higher than the threshold altitude, the terminal selects a first handover event at step 805. The first handover event corresponds to an aerial state of the terminal.

On the other hand, when the altitude of the terminal measured by the terminal is lower than the threshold altitude, the terminal selects a second handover event at step 807. The second handover event corresponds to a ground state of the terminal.

According to various embodiments of the disclosure, the terminal may determine an altitude state of the terminal at step 803 although this is not illustrated. For example, when the altitude of the terminal is higher than the threshold altitude, the terminal may determine the altitude state of the terminal as the aerial state, and may select the first handover event corresponding to the aerial state at step 805. In another example, when the altitude of the terminal is lower than the threshold altitude, the terminal may determine the altitude state of the terminal as the ground state, and may select the second handover event corresponding to the ground state at step 807.

Figure 9:
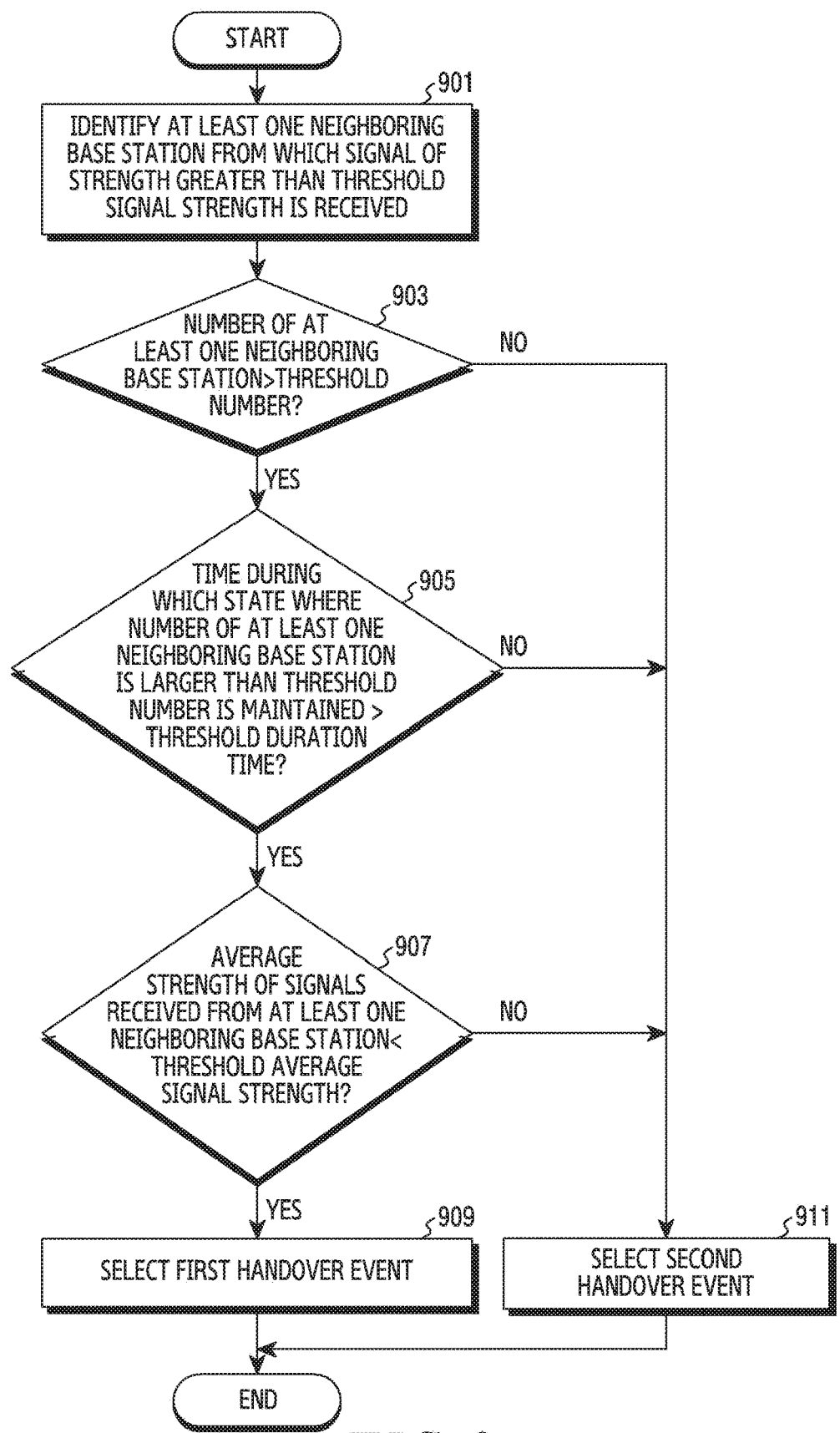
FIG. 9 is a flowchart of a terminal for determining a handover event based on various parameters in a wireless communication system according to various embodiments of the disclosure.

FIG. 9 illustrates a flowchart of a terminal for determining a handover event based on various parameters in a wireless communication system according to various embodiments of the disclosure. FIG. 9 illustrates an operating method of the terminal 120.

According to various embodiments of the disclosure, the terminal may receive, from a base station, parameters regarding a threshold signal strength, a threshold number, a threshold duration time, and a threshold average signal strength, through an RRC message or system information.

Operations of FIG. 9, which will be described below, are performed on the assumption that the terminal receives such parameters.

Referring to FIG. 9, at step 901, the terminal identifies at least one neighboring base station from which a signal of a strength greater than the threshold signal strength is received. For example, the terminal may measure a reference signals received power (RSRP) of the signal received from at least one neighboring base station, and may identify at least one neighboring base station the measured RSRP of which is greater than the threshold signal strength.

At step 903, the terminal determines whether the number of at least one neighboring base station from which the signal of the strength greater than the threshold signal strength is received is greater than or equal to the threshold number.

When the number of at least one neighboring base station from which the signal of the strength greater than the threshold signal strength is received is greater than or equal to the threshold number, the terminal may determine whether a time during which the state where the number of at least one neighboring base station from which the signal of the strength greater than the threshold signal strength is received is greater than or equal to the threshold number is maintained is longer than the threshold duration time at step 905. In another example, when the condition at step 903 is satisfied, the terminal may start a threshold timer and may determine whether a count of the threshold timer exceeds a predetermined time at step 905. Herein, the threshold timer may continuously count while the state where the number of at least one neighboring base station from which the signal of the strength greater than the threshold signal strength is received is greater than or equal to the threshold number is maintained. Otherwise, the terminal may select a second handover event and/or may stop the threshold timer at step 911.

When the time during which the state where the number of at least one neighboring base station from which the signal of the strength greater than the threshold signal strength is received is greater than or equal to the threshold number is maintained is longer than the threshold duration time, the terminal may determine whether an average strength of signals received from the at least one neighboring base station (the number of neighboring base stations discovered to measure the average strength is greater than or equal to the threshold number) is smaller than the threshold average signal strength at step 907. Otherwise, the terminal selects the second handover event at step 911.

When the average strength of the signals received from the at least one neighboring base station is smaller than the threshold average signal strength, the terminal selects a first handover event at step 909. Otherwise, the terminal selects the second handover event at step 911.

According to various embodiments of the disclosure, the first handover event corresponds to the aerial state of the terminal. The first handover event may include a first TTT and a first measurement condition (for example, the event A4). The second handover event corresponds to the ground state of the terminal. The second handover event may include a second TTT and a second measurement condition (for example, the event A3). In addition, the first measurement condition may correspond to a case where a signal strength of a neighboring base station is greater than a threshold value, and the second measurement condition may correspond to a case where the signal strength of the neighboring base station is greater than a signal strength of a base station by the threshold value. For example, when the state where the first measurement condition is satisfied is maintained for longer than the first TTT, the terminal may determine that the first handover event occurs, and the terminal may transmit, to the base station, a measurement report message including information regarding measurement performed to make such determination. In another example, when the state where the second measurement condition is satisfied is maintained for longer than the second TTT, the terminal may determine that the second handover event occurs, and the terminal may transmit, to the base station, a measurement report message including information regarding measurement performed to make such determination. In the above-described embodiments, the first TTT may be shorter than the second TTT.

According to various embodiments of the disclosure, the terminal may determine an altitude state of the terminal through steps 903, 905, and 907 although this is not illustrated. For example, when all of the conditions at steps 903, 905, and 907 are satisfied, the terminal may determine the altitude state of the terminal as the aerial state, and may select the first handover event corresponding to the aerial state at step 909. In another example, when at least one of the conditions at steps 903, 905, and 907 is not satisfied, the terminal may determine the altitude state of the terminal as the ground state, and may select the second handover event corresponding to the ground state at step 911.

Figure 10:
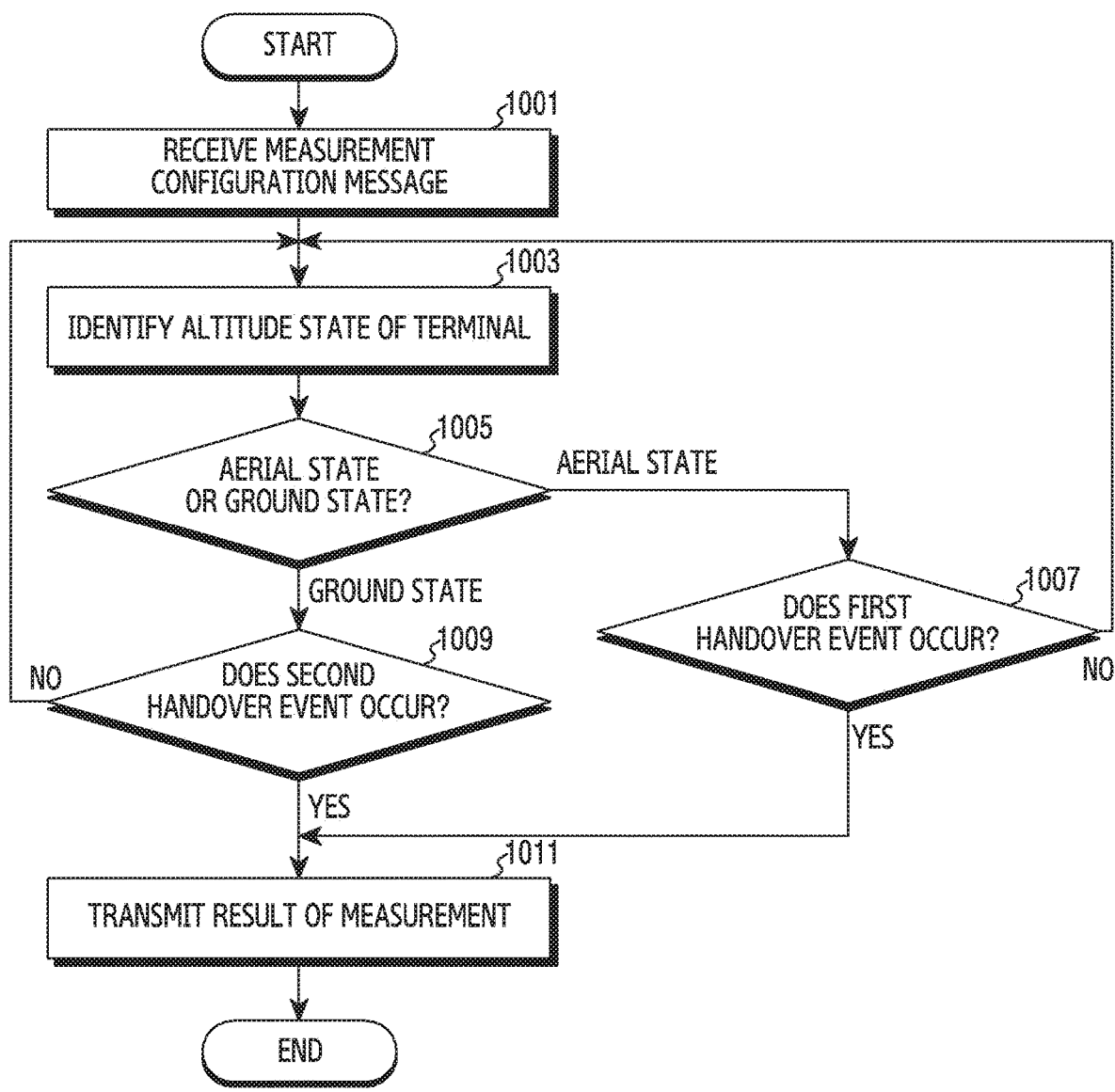
FIG. 10 is a flowchart of a terminal for determining a handover event and transmitting a measurement report message in a wireless communication system according to various embodiments of the disclosure.

FIG. 10 illustrates a flowchart of a terminal for determining a handover event and transmitting a measurement report message in a wireless communication system according to various embodiments of the disclosure. FIG. 10 illustrates operations of the terminal 120.

Referring to FIG. 10, at step 1001, the terminal receives a measurement configuration message. The measurement configuration message may include information regarding a threshold latitude, and configuration information regarding at least one handover event. In another example, the measurement configuration message may include information regarding at least one of a threshold signal strength, a threshold number, a threshold duration time, a threshold average signal strength. According to various embodiments of the disclosure, the measurement configuration message may not include the information regarding the threshold latitude, the threshold signal strength, the threshold number, the threshold duration time, the threshold average signal strength. In this case, at least one of these parameters may be included in system information received by the terminal.

At step 1003, the terminal performs signal measurement and identifies an altitude state of the terminal. For example, the terminal may identify the altitude state of the terminal by using at least one of the method described in FIG. 8 or the method described in FIG. 9.

At step 1005, the terminal determines whether the altitude state of the terminal is the aerial state or the ground state.

When the altitude state of the terminal is the aerial state, the terminal determines whether a first handover event occurs at step 1007. When the first handover event occurs, the terminal transmits, to a base station, a measurement report message including the result of measurement at step 1011. When the first handover event does not occur, the terminal returns to step 1003, and performs signal measurement and identifies the altitude of the terminal.

When the altitude state of the terminal is the ground state, the terminal determines whether a second handover event occurs at step 1009. When the second handover event occurs, the terminal transmits, to the base station, a measurement report message including the result of measurement at step 1011. When the second handover event does not occur, the terminal returns to step 1003, and performs signal measurement and identifies the altitude state of the terminal.

Hereinafter, embodiments in which a base station receives information regarding an altitude state of a terminal from the terminal and determines a handover event corresponding to the altitude state of the terminal will be described through FIGS. 11 to 12.

Figure 11:
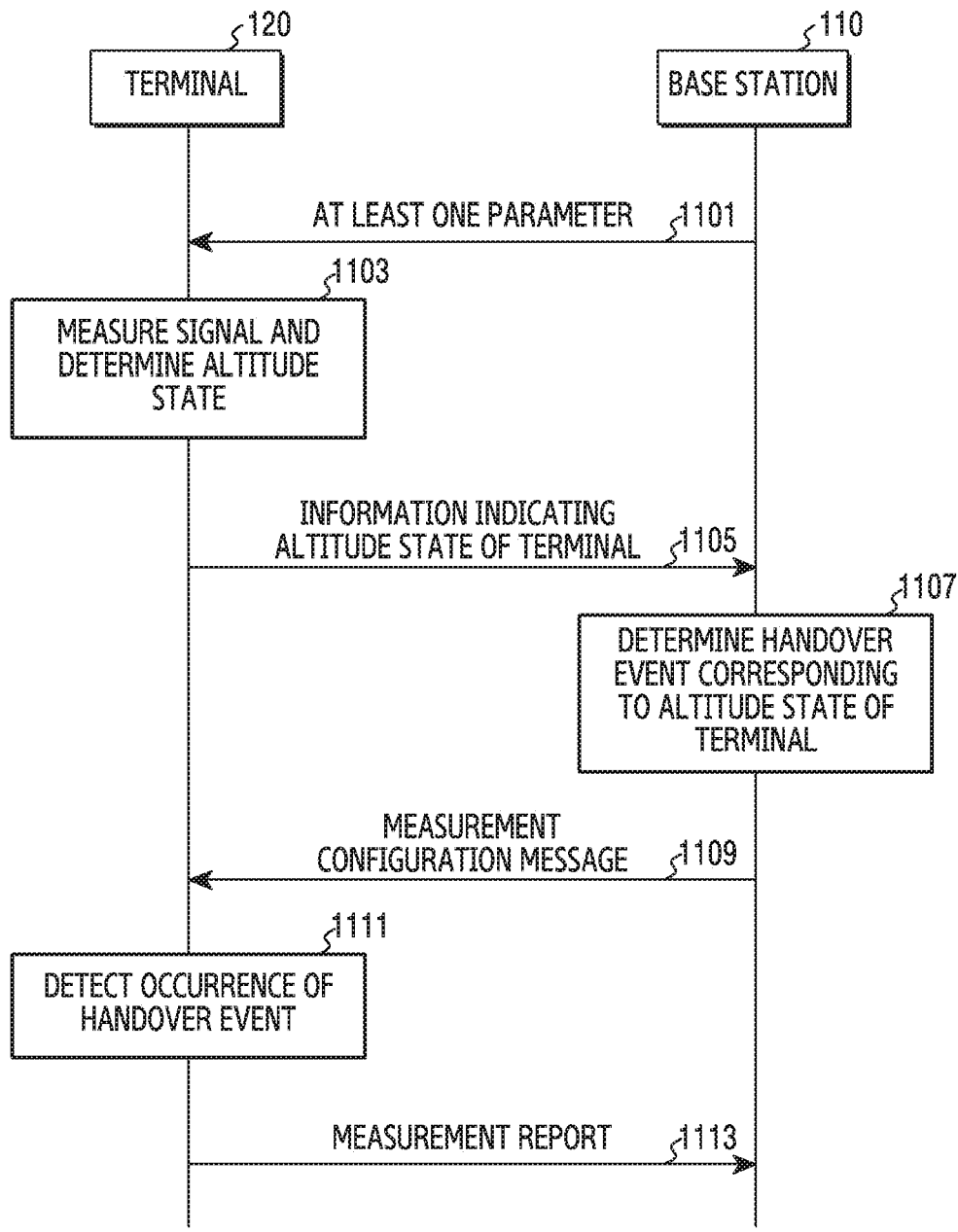
FIG. 11 is a view illustrating a signal flow for determining a handover event by a base station in a wireless communication system according to various embodiments of the disclosure.

FIG. 11 illustrates a signal flow for a base station to determine a handover event in a wireless communication system according to various embodiments of the disclosure. FIG. 11 illustrates a signal flow between the base station 110 and the terminal 120.

Referring to FIG. 11, at step 1101, the base station transmits at least one parameter to the terminal. For example, the at least one parameter may include at least one of a threshold altitude, a threshold signal strength, a threshold number, a threshold duration time, and a threshold average signal strength. The at least one parameter may be transmitted to the terminal through system information, a dedicated message, and/or dedicated signaling.

At step 1103, the terminal determines an altitude state of the terminal. For example, the terminal may determine the altitude state of the terminal according to the method described in FIG. 8 or 9.

At step 1105, the terminal transmits information indicating the altitude state of the terminal to the base station. According to various embodiments of the disclosure, the terminal may periodically or aperiodically determine the altitude state of the terminal, and, when the altitude state of the terminal is changed (for example, from the ground state to the aerial state or from the aerial state to the ground state), or when the altitude state of the terminal is initially determined, the terminal may transmit information indicating the altitude state of the terminal to the base station.

According to various embodiments of the disclosure, the information indicating the altitude state of the terminal may be referred to as "UE state information." The UE state information may be included in at least one of UEAssistanceInformation, UECapabilityInformation, or UEInformationResponse, and may be transmitted through at least one of UEAssitanceInformation, UECapabilityInformation, or UEInformationResponse.

At step 1107, the base station determines a handover event corresponding to the altitude state of the terminal. For example, when the altitude state of the terminal indicated by the terminal is the aerial state, the base station determines the first handover event including the first TTT and the first measurement condition. In another example, when the altitude state of the terminal indicated by the terminal is the ground state, the base station determines the second handover state including the second TTT and the second measurement condition.

At step 1109, the base station transmits a measurement configuration message to the terminal. The measurement configuration message may include configuration information regarding the handover event determined at step 1107. That is, according to various embodiments of the disclosure, the base station may transmit configuration information regarding a plurality of handover events to the terminal, and may cause the terminal to select a handover event by itself based on the altitude state of the terminal, but the base station may receive information indicating the altitude state of the terminal from the terminal, may determine a handover event corresponding to the altitude state of the terminal, and may transmit configuration information regarding the determined single handover event to the terminal.

At step 1111, the terminal detects the occurrence of the handover event. For example, when a state where a measurement condition related to the handover event is satisfied is maintained for longer than a TTT related to the handover event, the terminal may detect the occurrence of the handover event.

At step 1113, the terminal transmits a measurement report message to the base station. In response to the occurrence of the handover event being detected, the terminal transmits the measurement report message including the result of measurement to the base station. For example, the measurement report message may include information regarding whether measurement regarding a neighboring base station satisfies the handover event, and/or a time during which the handover event is satisfied. In another example, the measurement report message may include the altitude state of the terminal, and may include a flying path of the terminal. The base station may determine whether the handover of the terminal is performed by using information included in the measurement report message although this is not illustrated.

Figure 12:
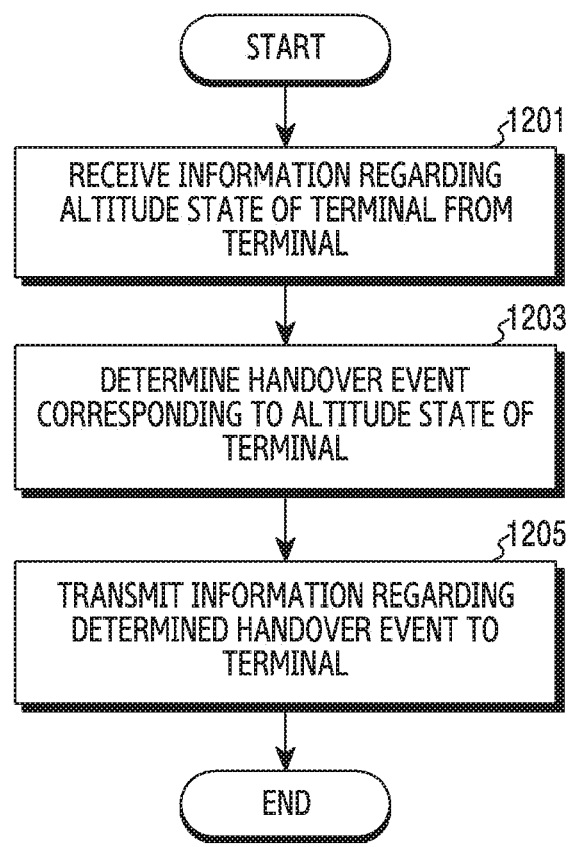
FIG. 12 is a flowchart of a base station for receiving information regarding an altitude state of a terminal from the terminal and determining a handover event in a wireless communication system according to various embodiments of the disclosure.
Figure 13:
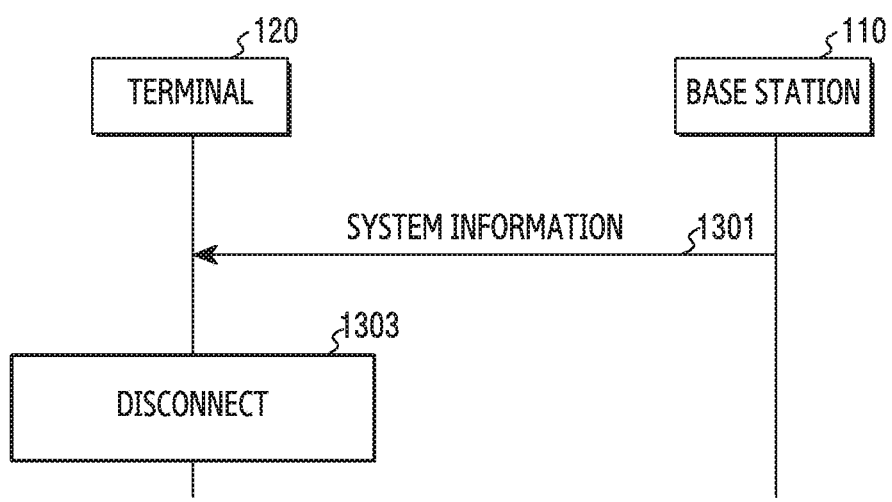
FIG. 13 is a view illustrating a signal flow for blocking an access of a terminal in an aerial state in a wireless communication system according to various embodiments of the disclosure.

FIG. 12 illustrates a flowchart of a base station for receiving information regarding an altitude state of a terminal from the terminal, and determining a handover event in a wireless communication system according to various embodiments of the disclosure. FIG. 12 illustrates operations of the base station 110.

system according to various embodiments. FIG. 13 illustrates a signal flow between the base station 110 and the terminal 120.

At step 1301, the base station transmits system information to the terminal. Herein, the system information may include information for indicating blocking of the access of the terminal. According to another embodiment, the information for indicating the blocking of the access of the terminal may be transmitted through information of other forms, in addition to the system information.

At step 1303, the terminal may be disconnected from the base station. In other words, the access of the terminal to the base station is blocked. According to various embodiments, the disconnection and/or blocking of the access of the terminal may be referred to as cell barring. When the terminal cannot access the base station due to the cell barring, the base station may discover another base station again, and may access discovered another base station.

In the embodiments described with reference to FIG. 13, information indicating blocking of the access of the terminal may be transmitted through system information. According to an embodiment, the base station may restrict the access of the terminal by using AC-barringConfig information of system information block number 2. The AC-barringConfig information may be configured as shown in table 1 presented below:

TABLE 1

| AC-BarringConfig ::= | SEQUENCE { |
|---|---|
| ac-BarringFactor | ENUMERATED { |
| | p00, p05, p10, p15, p20, p25, p30, p40, |
| | p50, p60, p70, p75, p80, p85, p90, p95}, |
| ac-BarringTime | ENUMERATED {s4, s8, s16, s32, s64, s128, s256, s512}, |
| ac-BarringForSpecialAC | BIT STRING (SIZE(5)) |
| } | |

Referring to FIG. 12, at step 1201, the base station receives information regarding an altitude state of the terminal from the terminal. In other words, the base station receives UE state information from the terminal.

At step 1203, the base station determines a handover event corresponding to the altitude state of the terminal. For example, when the altitude state of the terminal indicated by the terminal is the aerial state, the base station may determine the first handover event including the first TTT and the first measurement condition. In another example, when the altitude state of the terminal indicated by the terminal is the ground state, the base station determines the second handover event including the second TTT and the second measurement condition.

At step 1205, the base station transmits information regarding the determined handover event to the terminal. In other words, the base station transmits a measurement configuration message including configuration information regarding the handover event to the terminal. The configuration information regarding the handover event may be transmitted to the terminal through dedicated signaling.

When the base station does not support the aerial terminal or the aerial terminal is prohibited from moving within a geographical area supported by the base station, the base station may not allow the access of the terminal. Hereinafter, a method for the base station to disallow the access of an aerial terminal will be described in FIG. 13.

FIG. 13 illustrates a signal flow for blocking the access of a terminal in the aerial state in a wireless communication For example, in table 1 presented above, an access class of the aerial terminal may be expressed by ac-BarringForSpecialAC, and, when ac-BarringFactor value corresponding to the access class is set to p00, the access of the terminal may be blocked.

According to various embodiments, an operating method of a terminal in a wireless communication system may include a process of receiving, from a base station, configuration information regarding at least one handover event corresponding to an altitude state of the terminal, and a process of transmitting a measurement report message to the base station in response to occurrence of the at least one handover event.

According to various embodiments, the method may further include a process of determining the altitude state of the terminal based on at least one parameter including at least one of a threshold altitude, a threshold signal strength, a threshold number, a threshold duration time, a threshold average signal strength, and the at least one parameter may be included in the configuration information, or may be included in system information received by the terminal.

In various embodiments, the process of determining the altitude state of the terminal may include a process of measuring an altitude of the terminal, and a process of determining the altitude state of the terminal by comparing the altitude of the terminal and the threshold altitude, and the method may further include a process of determining the at least one handover event corresponding to the altitude state of the terminal.

In various embodiments, the process of determining the altitude state of the terminal may include a process of identifying at least one neighboring base station from which a signal of a strength greater than the threshold signal strength is received, and a process of determining the altitude state of the terminal based on whether the number of the at least one neighboring base station is greater than the threshold number, whether a time during which a state in which the number of the at least one neighboring base station is greater than the threshold number is maintained is longer than the threshold duration time, and whether an average strength of signals received from the at least one neighboring base station is smaller than the threshold average signal strength, and the method may further include a process of determining the at least one handover event corresponding to the altitude state of the terminal.

In various embodiments, the method may further include a process of transmitting information regarding the altitude state of the terminal to the base station.

In various embodiments, the altitude state of the terminal may include at least one of an aerial state and a ground state, and the aerial state may be a state in which the altitude of the terminal is higher than the threshold altitude, and the ground state may be a state in which the altitude of the terminal is lower than the threshold altitude.

In various embodiments, the at least one handover event may include at least one of a first handover event corresponding to the aerial state, and a second handover event corresponding to the ground state, the configuration information may include at least one of information regarding a first TTT and a first measurement condition related to the first handover event, and information regarding a second TTT and a second measurement condition related to the second handover event, the first TTT may be shorter than the second TTT, and the first measurement condition may correspond to a case where a signal strength of a neighboring base station is greater than a threshold value, and the second measurement condition may correspond to a case where the signal strength of the neighboring base station is greater than a signal strength of the base station by the threshold value.

In various embodiments, the method may further include a process of receiving a message indicating blocking of an access to the base station from the base station, and the altitude state of the terminal may be an aerial state and the base station may not support an aerial terminal.

According to various embodiments of the disclosure, an operating method of a base station in a wireless communication system may include a process of transmitting configuration information regarding at least one handover event corresponding to an altitude state of a terminal to the terminal, and a process of receiving a measurement report message from the terminal in response to occurrence of the at least one handover event.

In various embodiments, the method may further include a process of receiving information regarding an altitude state of the terminal from the terminal, and a process of determining the at least one handover event corresponding to the altitude state of the terminal.

In various embodiments, the altitude state of the terminal may include at least one of an aerial state and a ground state, and the aerial state may be a state in which the altitude of the terminal is higher than a threshold altitude, and the ground state may be a state in which the altitude of the terminal is lower than the threshold altitude.

In various embodiments, the at least one handover event may include at least one of a first handover event corresponding to the aerial state, and a second handover event corresponding to the ground state, the configuration information may include at least one of information regarding a first TTT and a first measurement condition related to the first handover event, and information regarding a second TTT and a second measurement condition related to the second handover event, the first TTT may be shorter than the second TTT, and the first measurement condition may correspond to a case where a signal strength of a neighboring base station is greater than a threshold value, and the second measurement condition may correspond to a case where the signal strength of the neighboring base station is greater than a signal strength of the base station by the threshold value.

In various embodiments, the method may further include a process of transmitting a message indicating blocking of an access to the base station to the terminal, and the altitude state of the terminal may be an aerial state and the base station may not support an aerial terminal.

According to various embodiments, a device of a terminal in a wireless communication system may include at least one transceiver which receives, from a base station, configuration information regarding at least one handover event corresponding to an altitude state of the terminal, and transmits a measurement report message to the base station in response to occurrence of the at least one handover event.

According to various embodiments, the device may further include at least one processor which determines the altitude state of the terminal based on at least one parameter including at least one of a threshold altitude, a threshold signal strength, a threshold number, a threshold duration time, a threshold average signal strength, and the at least one parameter may be included in the configuration information, or may be included in system information received by the terminal.

In various embodiments, the at least one processor may measure an altitude of the terminal, may determine the altitude state of the terminal by comparing the altitude of the terminal and the threshold altitude, and may determine the at least one handover event corresponding to the altitude state of the terminal.

In various embodiments, the at least one processor may identify at least one neighboring base station from which a signal of a strength greater than the threshold signal strength is received, and may determine the altitude state of the terminal based on whether the number of the at least one neighboring base station is greater than the threshold number, whether a time during which a state in which the number of the at least one neighboring base station is greater than the threshold number is maintained is longer than the threshold duration time, and whether an average strength of signals received from the at least one neighboring base station is smaller than the threshold average signal strength, and may determine the at least one handover event corresponding to the altitude state of the terminal.

In various embodiments, the at least one transceiver may transmit information regarding the altitude state of the terminal to the base station.

In various embodiments, the altitude state of the terminal may include at least one of an aerial state and a ground state, and the aerial state may be a state in which the altitude of the terminal is higher than the threshold altitude, and the ground state may be a state in which the altitude of the terminal is lower than the threshold altitude.

In various embodiments, the at least one handover event may include at least one of a first handover event corresponding to the aerial state, and a second handover event corresponding to the ground state, the configuration information may include at least one of information regarding a first TTT and a first measurement condition related to the first handover event, and information regarding a second TTT and a second measurement condition related to the second handover event, the first TTT may be shorter than the second TTT, and the first measurement condition may correspond to a case where a signal strength of a neighboring base station is greater than a threshold value, and the second measurement condition may correspond to a case where the signal strength of the neighboring base station is greater than a signal strength of the base station by the threshold value.

In various embodiments, the at least one transceiver may receive a message indicating blocking of an access to the base station from the base station, and the altitude state of the terminal may be an aerial state and the base station may not support an aerial terminal.

According to various embodiments of the disclosure, a device of a base station in a wireless communication system may include at least one transceiver which transmits configuration information regarding at least one handover event corresponding to an altitude state of a terminal to the terminal, and receives a measurement report message from the terminal in response to occurrence of the at least one handover event.

In various embodiments, the at least one transceiver may receive information regarding an altitude state of the terminal from the terminal, and the device may further include at least one processor which determines the at least one handover event corresponding to the altitude state of the terminal.

In various embodiments, the altitude state of the terminal may include at least one of an aerial state and a ground state, and the aerial state may be a state in which the altitude of the terminal is higher than a threshold altitude, and the ground state may be a state in which the altitude of the terminal is lower than the threshold altitude.

In various embodiments, the at least one handover event may include at least one of a first handover event corresponding to the aerial state, and a second handover event corresponding to the ground state, the configuration information may include at least one of information regarding a first TTT and a first measurement condition related to the first handover event, and information regarding a second TTT and a second measurement condition related to the second handover event, the first TTT may be shorter than the second TTT, and the first measurement condition may correspond to a case where a signal strength of a neighboring base station is greater than a threshold value, and the second measurement condition may correspond to a case where the signal strength of the neighboring base station is greater than a signal strength of the base station by the threshold value.

In various embodiments, the at least one transceiver may transmit a message indicating blocking of an access to the base station to the terminal, and the altitude state of the terminal may be an aerial state and the base station may not support an aerial terminal.

Methods based on the claims or the embodiments disclosed in specification of the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in specification of the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port a device which performs the embodiments of the disclosure. In addition, an additional storage device on a communication network may access a device which performs the embodiments of the disclosure.

In the above-described specific embodiments of the disclosure, elements included in the present disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While specific embodiments have been described in the detailed descriptions of the disclosure, it will be understood by those skilled in the art that various changes in form and details may be made therein without departing from the spirit and scope of the disclosure as defined by the appended claims. Therefore, the scope of the disclosure is defined not by the described embodiments but by the appended claims, and all differences within the scope will be construed as being included in the disclosure.

The invention claimed is:

1. A method performed by a terminal in a wireless communication system, the method comprising:
receiving, from a base station (BS), a configuration information for a height measurement including information on a threshold altitude and information on a threshold duration time;
comparing a height of the terminal and the threshold altitude;
transmitting, to the base station, a first height measurement report including information on an altitude state of the terminal in case that the height of the terminal is higher than the threshold altitude during the threshold duration time;
transmitting, to the base station, a second height measurement report including information on the altitude state of the terminal in case that the height of the terminal is lower than the threshold altitude during the threshold duration time;
receiving, from the base station, measurement configuration information on a handover event corresponding to the altitude state of the terminal; and
transmitting a measurement report to the BS based on the measurement configuration information on the handover event, in case that a measurement condition associated with the handover event is fulfilled.

2. The method of claim 1, wherein the UE terminal is an aerial terminal.

3. The method of claim 1, further comprising transmitting information regarding a flying path of the UE terminal to the base station,
wherein the transmitting the information on the altitude state of the terminal is performed when the altitude state of the terminal is changed.

4. The method of claim 1, further comprising:
identifying whether the terminal is an aerial terminal based on subscription information of the terminal.

5. The method of claim 1,
wherein the measurement configuration information includes information on a threshold signal strength and information on a number of neighboring base stations that fulfill a condition regarding the threshold signal strength.

6. The method of claim 5, wherein the altitude state of the terminal is determined based on the information on the threshold signal strength, and the information on the number of neighboring base stations.

7. The method of claim 1, wherein, in case that the height of the terminal is higher than the threshold altitude, a trigger event associated with the handover event corresponds to a case where a signal strength of a neighboring base station is larger than a threshold value.

8. The method of claim 1, wherein the measurement report further includes information on whether a measurement on a neighboring base station satisfy a condition of the handover event, and a time satisfying the condition of the handover event.

9. A terminal comprising:
at least one processor; and
at least one transceiver operatively coupled to the at least one processor is configured to:
receive, from a base station (BS), a configuration information for a height measurement including information on a threshold altitude and information on a threshold duration time,
compare a height of the terminal and the threshold altitude,
transmit, to the base station, a first height measurement report including information on an altitude state of the terminal in case that the height of the terminal is higher than the threshold altitude during the threshold duration time,
transmit, to the base station, a second height measurement report including information on the altitude state of the terminal in case that the height of the terminal is lower than the threshold altitude during the threshold duration time,
receive, from the base station, measurement configuration information on a handover event corresponding to the altitude state of the terminal, and
transmit a measurement report to the BS based on the measurement configuration information on the handover event, in case that a measurement condition associated with the handover event is fulfilled.

10. The terminal of claim 9, wherein the UE terminal is an aerial terminal.

11. The terminal of claim 9,
wherein the at least one transceiver is further configured to transmit information regarding a flying path of the terminal to the base station, and
wherein the at least one processor is configured to transmit the information on the altitude state of the terminal when the altitude state of the terminal is changed.

12. The terminal of claim 10, wherein the at least one processor is further configured to identify whether the UE terminal is the aerial terminal based on subscription information of the terminal.

13. The terminal of claim 9, wherein the measurement configuration information includes information on a threshold signal strength and information on a number of neighboring base stations that fulfill a condition regarding the threshold signal strength.

14. The terminal of claim 13, wherein the altitude state of the terminal is determined based on the information on the threshold signal strength, and the information on the number of neighboring base stations.

15. The terminal of claim 9, wherein, in case that the height of the terminal is higher than the threshold altitude, a trigger event associated with the handover event corresponds to a case where a signal strength of a neighboring base station is larger than a threshold value.

16. The terminal of claim 9, wherein the measurement report further includes information on whether a measurement on a neighboring base station satisfy a condition of the handover event, and a time satisfying the condition of the handover event.

17. A base station (BS) in a wireless communication system comprising:
at least one processor; and
at least one transceiver operatively coupled to the at least one processor is configured to:
transmit, to a terminal, a configuration information for a height measurement including information on a threshold altitude and information on a threshold duration time, wherein a height of the terminal is compared with the threshold altitude;
receive, from the terminal, a first height measurement report including information on an altitude state of the terminal in case that the height of the terminal is higher than the threshold altitude during the threshold duration time;
receive, from the terminal, a second height measurement report including information on the altitude state of the terminal in case that the height of the terminal is lower than the threshold altitude during the threshold duration time;
transmit, to the terminal, measurement configuration information on a handover event corresponding to the altitude state of the terminal; and
receive, from the terminal, a measurement report based on the measurement configuration information on the handover event, in case that a measurement condition associated with the handover event is fulfilled.

18. The BS of claim 17, wherein the terminal is an aerial terminal.

19. The BS of claim 17, the at least one transceiver is further configured to receive information regarding a flying path of the terminal from the terminal,
wherein the at least one processor is configured to receive the information on the altitude state of the terminal when the altitude state of the terminal is changed.

* * * * *